UNITED STATES PATENT OFFICE 2,112,140

PROCESS FOR PREPARING CARBOCYANINE DYES

Leslie G. S. Brooker and Frank L. White, Rochester, N. Y., assignors, by mesne assignments, to Eastman Kodak Company, Jersey City, N. J., a corporation of New Jersey No Drawing. Application July 10, 1935, Serial No. 30,736

24 Claims. (Cl. 260—44)

This invention relates to carbocyanine dyes and more particularly to symmetrical and unsymmetrical carbocyanine dyes, containing a substituent on the central carbon atom of the trimethenyl chain.

We have found the heretofore proposed methods of preparing unsymmetrical carbocyanine dyes, containing a substituent on the central carbon atom of the trimethenyl chain, to be generally unsatisfactory. In fact, most of such unsymmetrical carbocyanine dyes cannot be prepared by the heretofore proposed methods. Now, we have found that these unsymmetrical carbocyanine dyes can be prepared by condensing cyclammonium quaternary salts containing a reactive methyl group with ketones of the following structure:

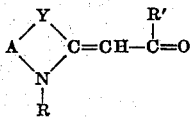

Wherein A represents a phenylene group, such as the phenylene group, the methylphenylene group or the chlorophenylene group, or a naphthylene group, Y represents sulfur or selenium, R represents an alkyl group and R' represents an alkyl, an aralkyl or an aryl group. Such ketones are fully described in our co-pending application Serial No. 29,916 filed July 5, 1935. We have further found our new process to be a satisfactory method of producing symmetrical carbocyanines containing a substituent on the central carbon atom of the trimethenyl chain.

The object, therefore, of our invention is to provide unsymmetrical carbocyanine dyes, containing a substituent on the central carbon atom of the trimethenyl chain. A further object is to provide a process for the preparation of symmetrical and unsymmetrical carbocyanine dyes containing a substituent on the central carbon atom of the trimethenyl chain. Other more specific objects will become apparent upon a complete perusal of these specifications.

In general, our process of preparing these carbocyanine dyes comprises condensing a ketone of the hereinabove described structure with a cyclammonium salt, containing a reactive methyl group, in the presence of a water-binding agent. The process can be illustrated by the following reaction wherein the ketone, 1-acetyl-methylene-2-ethylbenzothiazoline, is condensed with the ethiodide of 1-methylbenzothiazole, in the presence of acetic anhydride:

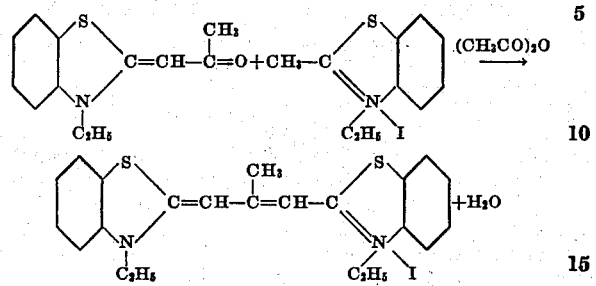

In a similar manner, quaternary salts of 1-methylbenzoxazole, 1-methylbenzoselenazole or 2-methyl-β-naphthothiazole or the like can be condensed with the same ketone or related ketones to yield symmetrical or unsymmetrical dyes. Other quaternary salts, such as the alkyl-p-toluenesulfonates, can be used. The condensations are usually accelerated by heating, although they do take place slowly at ordinary temperatures, in the presence of acetic anhydride. The condensations can be effected in the absence of water-binding agents by heating, but the results are generally not satisfactory.

The following examples serve to illustrate our invention, but it is to be understood that our invention is not limited thereby except as indicated in the appended claims.

EXAMPLE 1.—*2,2'-Diethyl-8-methyl-3,4-benzothiacarbocyanine iodide*

0.73 g. (1 mol.) of 1-acetylmethylene-2-ethylbenzothiazoline, 1.33 g. (1 mol.) of 2-methyl-β-naphthathiazole etho-p-toluenesulfonate were refluxed for fifteen minutes in 10 cc. of acetic anhydride. The reaction mixture was cooled and the dye precipitated with ether. The residue was dissolved in methyl alcohol and the dye precipitated as the iodide with potassium iodide. The dye was then washed with water followed by acetone. Recrystallization was effected from methyl alcohol (260 cc. per gram of dye). The dye was obtained as reddish coppery crystals which gave a purplish solution in methyl alcohol. The dye sensitized a photographic silver bromide emulsion to 680 millimicrons with maximum sensitivity at 550 millimicrons and 615 millimicrons.

EXAMPLE 2.—*2,2'-Diethyl-8-methyl-3,4-benzothiacarbocyanine iodide*

0.67 g. (1 mol.) of 2-acetylmethylene-1-ethyl-β-naphthathiazoline and 0.87 g. (1 mol.) of 1-methylbenzothiazole etho-p-toluenesulfonate were refluxed for fifteen minutes in 15 cc. of acetic anhydride. The dye was isolated as in Example 1, and, of course, had the same properties as the dye of Example 1.

EXAMPLE 3.—*2'-Ethyl-2,8-dimethyl-3,4 benzoxathiacarbocyanine iodide*

2.2 g. (1 mol.) of 1-acetylmethylene-2-ethyl-benzothiazoline, 3.6 g. (1 mol.) of 2-methyl-β-naphthoxazole metho-p-toluenesulfonate were refluxed for 20 minutes in 10 cc. of acetic anhydride. The reaction mixture was cooled and the dye precipitated with ether. The residue was dissolved in methyl alcohol and the dye precipitated as the iodide with potassium iodide. The crude dye was washed with water and finally with acetone. Recrystallization was effected from methyl alcohol, the dye being obtained as minute purplish crystals which gave a pink solution in methyl alcohol. The dye sensitized a gelatine-silver-bromide emulsion to 630 millimicrons with maximum sensitivity at 555 millimicrons.

EXAMPLE 4.—*4-Chloro-2,8-diethyl-2'-methylthiacarbocyanine iodide*

0.73 g. (1 mol.) of 2-methyl-1-propionyl-methylene-benzothiazoline and 1.28 g. (1 mol.) of 4-chloro-1-methylthiazole etho-p-toluenesulfonate (made by heating equimolecular proportions of 4-chloro-1-methylbenzothiazole and ethyl-p-toluenesulfonate for 7 days at 100° C. and grinding the resulting product with acetone) were refluxed for fifteen minutes with 10 cc. of acetic anhydride. The dye was isolated as in Example 1 and obtained as reddish brown needles with double green and blue reflex upon recrystallization from methyl alcohol. Sensitized gelatine-silver-bromide emulsion to 680 millimicrons with maximum sensitivity at 635.

EXAMPLE 5.—*2,8-Diethyl-2'-methyl-3,4-benzothiacarbocyanine iodide*

0.73 g. (1 mol.) of 2-methyl-1-propionyl-methylene-benzothiazoline and 1.33 g. (1 mol.) of 2-methyl-β-naphthothiazole etho-p-toluenesulfonate were refluxed for 15 minutes in 10 cc. of acetic anhydride. The dye was isolated as in Example 1 and obtained as greenish crystals upon recrystallization from methyl alcohol. Sensitized gelatino-silver-bromide emulsion to 700 millimicrons with maximum sensitivity at 650.

EXAMPLE 6.—*2,8-Diethyl-2'-methyloxathiacarbocyanine iodide*

0.73 g. (1 mol.) of 2-methyl-1-propionyl-methylene-benzothiazoline and 2.89 g. (1 mol.) of 1-methylbenzoxazole ethiodide were refluxed for fifteen minutes in 10 cc. of acetic anhydride. The reaction mixture was cooled, ether added, chilled and the solvent portion decanted. The residue was boiled with acetone, chilled, filtered and washed and dried. Recrystallization was effected from ethyl alcohol (95%). The dye was obtained as reddish orange powder. Sensitized photographic emulsion to 600 millimicrons with maximum sensitivity at 545.

EXAMPLE 7.—*2'-Allyl-8-ethyl-2-methyl-3,4 benzothiacarbocyanine iodide*

2.45 g. (1 mol.) of 2-allyl-1-propionylmethylene-benzothiazoline and 3.85 g. (1 mol.) of 2-methyl-β-naphthothiazole metho-p-toluenesulfonate were refluxed for fifteen minutes with 15 cc. of acetic anhydride. The crude product was isolated as in Example 1. Following recrystallization from methyl alcohol, the dye was obtained as minute green crystals. Sensitized a gelatino-silver-bromide emulsion to 710 millimicrons with maximum sensitivity at 640 and 550.

EXAMPLE 8.—*2,8-Diethyl-2'-n-proplyselenathiacarbocyanine iodide*

2.47 g. (1 mol.) of 1-propionylmethylene-2-n-propylbenzothiazoline and 3.52 g. (1 mol.) of 1-methylbenzoselenazole ethiodide were refluxed in 15 cc. of acetic anhydride for fifteen minutes. The crude product was isolated as in Example 6. Following recrystallization from methyl alcohol, the dye was obtained as dark blue crystals. Sensitized a gelatino-silver-bromide emulsion to 670 millimicrons, with maximum sensitivity at 615 and 485.

EXAMPLE 9.—*4'-Chloro-2,2',8-triethyl-3,4-benzothiacarbocyanine iodide*

0.89 g. (1 mol.) of 4-chloro-2-ethyl-1-propionyl-methylene-benzothiazoline and 1.33 g. (1 mol.) of 2-methyl-β-naphthothiazole etho-p-toluenesulfonate were refluxed in 10 cc. of acetic anhydride for fifteen minutes. The crude product was isolated as in Example 1. Following recrystallization from methyl alcohol, the dye was obtained as dark green crystals. Sensitized a gelatino-silver-bromide emulsion to 710 millimicrons with maximum sensitivity at 540 and 655.

EXAMPLE 10.—*4'-Chloro-2,2',8-triethyl-3,4-benzothiacarbocyanine iodide*

2.83 g. (1 mol.) of 1-ethyl-2-propionylmethylene-β-naphthothiazoline and 3.84 g. (1 mol.) 4-chloro-1-methylbenzothiazole etho-p-toluenesulfonate were refluxed for fifteen minutes in 10 cc. of acetic anhydride. The crude product was isolated as in Example 1. The dye, of course, has the properties of the dye in Example 9.

EXAMPLE 11.—*2,2'-Diethyl-8-methyl-3,4,3',4'-dibenzothiacarbocyanine bromide*

1.35 g. (1 mol.) of 2-acetylmethylene-1-ethyl-β-naphthothiazoline and 2 g. (1 mol.) of 2-methyl-β-naphthothiazole etho-p-toluenesulfonate were refluxed for thirty minutes in 15 cc. of acetic anhydride. The crude dye was isolated as in Example 1, except that the dye was precipitated as the bromide with potassium bromide. Following recrystallization from methyl alcohol, the dye was obtained as green crystals. The sensitizing effect of this dye on gelatino-silver-bromide emulsions is well known.

EXAMPLE 12.—*2,2'-Diethyl-8,9-dimethyl-3,4-benzothiacarbocyanine iodide*

2.69 g. (1 mol.) of 2-acetylmethylene-1-ethyl-β-naphthothiazoline and 3.19 g. (1 mol.) of 1-ethylbenzothiazole ethiodide were refluxed for fifteen minutes in 20 cc. of acetic anhydride. The dye was isolated as in Example 6. Following recrystallization from methyl alcohol, the dye was obtained as reddish coppery crystals. Sensitized a gelatino-silver-bromide emulsion to 605 millimicrons with maximum sensitivity at 530.

Example 13.—2,2'-Diethyl-8-methyl-3',4'-benzoselenathiacarbocyanine iodide 1.35 g. (1 mol.) of 2-acetylmethylene-1-ethyl-β-naphthothiazoline and 1.76 g. (1 mol.) of 1-methylbenzoselenazole ethiodide were refluxed in 25 cc. of acetic anhydride for thirty minutes. The dye was isolated as in Example 6. Following recrystallization from methyl alcohol, the dye was obtained as reddish coppery crystals. Sensitized a gelatino-silver-bromide emulsion to 690 millimicrons with maximum sensitivity at 610 and 550.

Example 14.—2,2'-Diethyl-8-methyl-3',4'-benzoxathiacarbocyanine iodide 2.69 g. (1 mol.) of 2-acetylmethylene-1-ethyl-β-naphthothiazoline and 2.89 g. (1 mol.) of 1-methylbenzoxazole ethiodide were refluxed for fifteen minutes in 20 cc. of acetic anhydride. The dye was isolated as in Example 6. Following recrystallization from methyl alcohol, the dye was obtained as purplish needles with a blue reflex. Sensitized gelatino-silver-bromide emulsion to 620 millimicrons with maximum sensitivity at 555.

Example 15.—2,2',8-Triethyl-3,4-benzothiacarbocyanine iodide 2.83 g. (1 mol.) of 1-ethyl-2-propionylmethylene-β-naphthothiazoline and 3.05 g. (1 mol.) of 1-methylbenzothiazole ethiodide were refluxed for fifteen minutes in 15 cc. of acetic anhydride. The dye was isolated as in Example 6. Following recrystallization from methyl alcohol, the dye was obtained as green crystals. Sensitized a gelatino-silver-bromide emulsion to 680 millicrons with maximum sensitivity at 620 and 550.

Example 16.—2,2',8-Triethyl-3'4'-benzoselenathiacarbocyanine iodide 2.83 g. (1 mol.) of 1-ethyl-2-propionyl-methylene-β-naphthothiazoline and 3.52 g. (1 mol.) of 1-methylbenzoselenazole ethiodide were refluxed for fifteen minutes in 15 cc. of acetic anhydride. The dye was isolated as in Example 6. Following recrystallization from methyl alcohol, the dye was obtained as minute dark green crystals. Sensitized a gelatino-silver-bromide emulsion to 710 millimicrons with maximum sensitivity at 650 and 540.

Example 17.—2,2',8-Triethyl-3'4',-benzoxathiacarbocyanine iodide 2.83 g. (1 mol.) of 1-ethyl-2-propionylmethylene-β-naphthothiazoline and 2.89 g. (1 mol.) of 1-methylbenzoxazole ethiodide were refluxed for fifteen minutes in 10 cc. of acetic anhydride. The dye was isolated as in Example 6. Following recrystallization from ethyl alcohol (95%) the dye was obtained as dull brownish crystals. Sensitized a gelatino-silver-bromide emulsion to 640 millimicrons with maximum sensitivity at 588.

Example 18.—2,8-Diethyl-2'-methyl-3',4'-benzoselenathiacarbocyanine iodide 0.93 g. (1 mol.) of 2-ethyl-1-propionylmethylenebenzoselenazoline and 1.28 g. (1 mol.) of 2-methyl-β-naphthothiazole metho-p-toluene-sulfonate were refluxed for fifteen minutes in 10 cc. of acetic anhydride. The dye was isolated as in Example 6. Following recrystallization from methyl alcohol, the dye was obtained as dull greenish crystals. Sensitized a gelatino-silver-bromide emulsion to 720 millimicrons, with maximum sensitivity at 640 and 540.

Example 19.—2,2',-Diethyl-8-phenylthiacarbocyanine iodide 1.4 g. (1 mol.) of 1-benzoylmethylene-2-ethyl-benzothiazoline, 1.5 g. (1 mol.) of 1-methylbenzothiazole ethiodide were refluxed for fifteen minutes in 15 cc. of acetic anhydride. The dye was isolated as in Example 6. Following recrystallization from methyl alcohol, the dye was obtained as shiny green crystals. Sensitized a gelatino-silver-bromide-emulsion to 650 millimicrons, with maximum sensitivity at 620.

From these examples, it is apparent that a large number of symmetrical and unsymmetrical carbocyanines, containing a substituent attached to the central carbon atom of the trimethenyl chain can be prepared by our improved procedure. All of these dyes are useful for improving and extending the sensitivity of photographic gelatino-silver-bromide emulsions.

The ketones employed in our new process described herein can be prepared as set forth in our copending application Serial No. 29,916, filed July 5, 1935, by reacting the appropriate cyclammonium alkyl quaternary salt containing a reactive methyl group with an acyl halide, in the presence of an acid-binding agent, e. g. pyridine. Typical ketones set forth in our copending application are, for example, 1-acetylmethylene-2-ethylbenzothiazoline, 1-ethyl-2-propionylmethylene-β-naphthothiazoline, 2-ethyl-1-propionylmethylenebenzoselenazoline, 1-benzoylmethylene-2-ethyl-benzothiazoline, 2-ethyl-1-lauroylmethylenebenzothiazoline, 2-ethyl-1-furoylmethylenebenzothiazoline and the like.

What we claim as our invention and desire to be secured by Letters Patent of the United States is:

1. A process for preparing a carbocyanine dye comprising condensing, under the influence of heat, a cyclammonium alkyl quaternary salt selected from the group consisting of benzothiazole, naphthothiazole, benzoselenazole, benzoxazole and naphthoxazole alkyl quaternary salts containing a reactive methyl group, with a compound of the following formula:

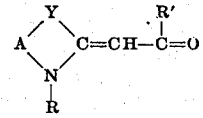

wherein A represents an organic group selected from the group consisting of phenylene and naphthylene groups, Y represents an atom selected from the group consisting of sulfur and selenium, R represents an alkyl group and R' represents a group selected from the group consisting of alkyl, aralkyl, and aryl groups.

2. A process for preparing a carbocyanine dye comprising condensing, under the influence of heat and in the presence of a water-binding agent, a cyclammonium alkyl quaternary salt selected from the group consisting of benzothiazole, naphthothiazole, benzoselenazole, benzoxazole and naphthoxazole alkyl quaternary salts containing a reactive methyl group, with a compound of the following formula:

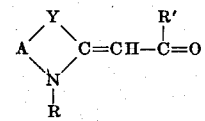

wherein A represents an organic group selected from the group consisting of phenylene and naphthylene groups, Y represents an atom selected from the group consisting of sulfur and selenium, R represents an alkyl group and R' represents a group selected from the group consisting of alkyl, aralkyl and aryl groups.

3. A process for preparing a carbocyanine dye comprising condensing, in the presence of a water-binding agent, a cyclammonium alkyl quaternary salt selected from the group consisting of benzothiazole, naphthothiazole, benzoselenazole, benzoxazole and naphthoxazole alkyl quaternary salts containing a reactive methyl group, with a compound of the following formula:

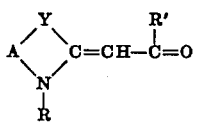

wherein A represents an organic group selected from the group consisting of phenylene and naphthylene groups, Y represents an atom selected from the group consisting of sulfur and selenium, R represents an alkyl group and R' represents a group selected from the group consisting of alkyl, aralkyl and aryl groups.

4. A process for preparing a carbocyanine dye comprising condensing, in the presence of a fatty acid anhydride, a cyclammonium alkyl quaternary salt selected from the group consisting of benzothiazole, naphthothiazole, benzoselenazole, benzoxazole and naphthoxazole alkyl quaternary salts containing a reactive methyl group, with a compound of the following formula:

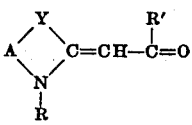

wherein A represents an organic group selected from the group consisting of phenylene and naphthylene groups, Y represents an atom selected from the group consisting of sulfur and selenium, R represents an alkyl group and R' represents a group selected from the group consisting of alkyl, aralkyl and aryl groups.

5. A process for preparing a carbocyanine dye comprising condensing, in the presence of acetic anhydride, a cyclammonium alkyl quaternary salt selected from the group consisting of benzothiazole, naphthothiazole, benzoselenazole, benzoxazole and naphthoxazole alkyl quaternary salts containing a reactive methyl group, with a compound of the following formula:

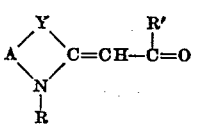

wherein A represents an organic group selected from the group consisting of phenylene and naphthylene groups, Y represents an atom selected from the group consisting of sulfur and selenium, R represents an alkyl group and R' represents a group selected from the group consisting of alkyl, aralkyl and aryl groups.

6. A process for preparing a carbocyanine dye comprising condensing, in the presence of a water-binding agent, a cyclammonium alkyl quaternary salt selected from the group consisting of benzothiazole, naphthothiazole, benzoselenazole, benzoxazole and naphthoxazole alkyl quaternary salts containing a reactive methyl group with a compound of the following formula:

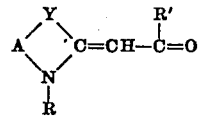

wherein A represents an organic group selected from the group consisting of phenylene and naphthylene groups, Y represents an atom selected from the group consisting of sulfur and selenium and R and R' represent alkyl groups.

7. A process for preparing a carbocyanine dye comprising condensing, in the presence of an organic acid anhydride, a cyclammonium alkyl quaternary salt selected from the group consisting of benzothiazole, naphthothiazole, benzoselenazole, benzoxazole, and naphthoxazole alkyl quaternary salts containing a reactive methyl group with a compound of the following formula:

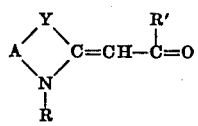

wherein A represents an organic group selected from the group consisting of phenylene and naphthylene groups, Y represents an atom selected from the group consisting of sulfur and selenium and R and R' represent alkyl groups.

8. A process for preparing a carbocyanine dye comprising condensing, in the presence of a fatty acid anhydride, a cyclammonium alkyl quaternary salt selected from the group consisting of benzothiazole, naphthothiazole, benzoselenazole, benoxazole, and naphthoxazole alkyl quaternary salts containing a reactive methyl group with a compound of the following formula:

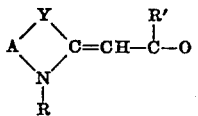

wherein A represents an organic group selected from the group consisting of phenylene and naphthylene groups, Y represents an atom selected from the group consisting of sulfur and selenium and R and R' represent alkyl groups.

9. A process for preparing a carbocyanine dye comprising condensing, in the presence of acetic anhydride, a cyclammonium alkyl quaternary salt selected from the group consisting of benzothiazole, naphthothiazole, benzoselenazole, benzoxazole and naphthoxazole alkyl quarternary salts containing a reactive methyl group with a compound of the following formula:

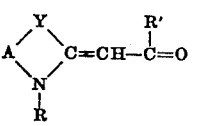

wherein A represents an organic group selected from the group consisting of phenylene and naphthylene groups, Y represents an atom selected from the group consisting of sulfur and selenium and R and R' represent alkyl groups.

10. A process for preparing a carbocyanine dye comprising condensing, in the presence of a fatty acid anhydride, a cyclammonium alkyl quaternary salt selected from the group consisting of benzothiazole, naphthothiazole, benzoxazole, naphthoxazole and benzoselenazole alkyl quarternary salts containing a reactive methyl group with a compound of the following formula:

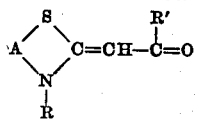

wherein A represents a phenylene group and R and R' represent alkyl groups.

11. A process for preparing a carbocyanine dye comprising condensing, in the presence of acetic anhydride, a cyclammonium alkyl quarternary salt selected from the group consisting of benzothiazole, naphthothiazole, benzoxazole, naphthoxazole and benzoselenazole alkyl quaternary salts containing a reactive methyl group with a compound of the following formula:

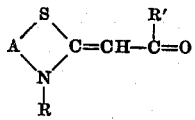

wherein A represents a phenylene group and R and R' represent alkyl groups.

12. A process for preparing a carbocyanine dye comprising condensing, in the presence of a fatty acid anhydride, a benzothiazole alkyl quaternary salt containing a reactive methyl group with a 1-alkyl-2-propionylmethylene-β-naphthothiazoline.

13. A process for preparing a carbocyanine dye comprising condensing, in the presence of a fatty acid anhydride, a benzothiazole alkiodide containing a reactive methyl group with a 1-alkyl-2-propionylmethylene-β-naphthothiazoline.

14. A process for preparing a carbocyanine dye comprising condensing, in the presence of acetic anhydride, 1-methylbenzothiazole ethiodide with 1-ethyl-2-propionylmethylene-β-naphthothiazoline.

15. A process for preparing a carbocyanine dye comprising condensing, in the presence of a fatty acid anhydride, a cyclammonium alkyl quaternary salt selected from the group consisting of benzothiazole, naphthothiazole, benzoxazole, naphthoxazole and benzoselenazole alkyl quaternary salts containing a reactive methyl group with a compound of the following formula:

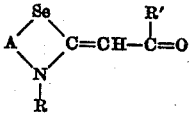

wherein A represents a phenylene group and R and R' represent alkyl groups.

16. A process for preparing a carbocyanine dye comprising condensing, in the presence of acetic anhydride, a cyclammonium alkyl quaternary salt selected from the group consisting of benzothiazole, naphthothiazole, benzoxazole, naphthoxazole and benzoselenazole alkyl quaternary salts containing a reactive methyl group with a compound of the following formula:

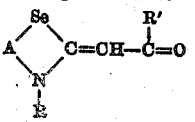

wherein A represents a phenylene group and R and R' represent alkyl groups.

17. A process for preparing a carbocyanine dye comprising condensing, in the presence of a fatty acid anhydride, a naphthothiazole alkyl quaternary salt containing a reactive methyl group with a 1-alkyl-2-propionylmethylenebenzoselenazoline.

18. A process for preparing a carbocyanine dye comprising condensing, in the presence of acetic anhydride, a β-naphthothiazole alkiodide containing a reactive methyl group with a 1-alkyl-2-propionylmethylenebenzoselenazoline.

19. A process for preparing a carbocyanine dye comprising condensing, in the presence of acetic anhydride, 2-methyl-β-naphthothiazole ethiodide with 1-ethyl-2-propionylmethylenebenzoselenazole.

20. A process for preparing a carbocyanine dye comprising condensing, in the presence of a fatty acid anhydride, a cyclammonium alkyl quaternary salt selected from the group consisting of benzothiazole, naphthothiazole, benzoxazole, naphthoxazole, and benzoselenazole alkyl quaternary salts containing a reactive methyl group with a compound of the following formula:

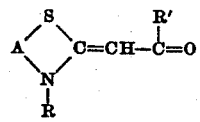

wherein A represents a naphthylene group and R and R' represent alkyl groups.

21. A process for preparing a carbocyanine dye comprising condensing, in the presence of acetic anhydride, a cyclammonium alkyl quaternary salt selected from the group consisting of benzothiazole, naphthothiazole, benzoxazole, naphthoxazole and benzoselenazole alkyl quaternary salts containing a reactive methyl group with a compound of the following formula:

wherein A represents a naphthylene group and R and R' represent alkyl groups.

22. A process for preparing a carbocyanine dye comprising condensing, in the presence of a fatty acid anhydride, a benzoxazole alkyl quaternary salt containing a reactive methyl group with a 1-alkyl-2-propionylmethylene-β-naphthothiazoline.

23. A process for preparing a carbocyanine dye comprising condensing, in the presence of acetic anhydride, a benzoxazole alkiodide containing a reactive methyl group with a 1-alkyl-2-propionylmethylene-β-naphthothiazoline.

24. A process for preparing a carbocyanine dye comprising condensing, in the presence of acetic anhydride, 1-methylbenzoxazole ethiodide with 1-ethyl-2-propionylmethylene-β-naphthothiazoline.

LESLIE G. S. BROOKER.
FRANK L. WHITE.